United States Patent
Su et al.

(10) Patent No.: US 10,542,520 B2
(45) Date of Patent: *Jan. 21, 2020

(54) EFFICIENT PAGING AND IDLE MODE WAKEUP FOR WIRELESS DEVICES SUPPORTING COVERAGE ENHANCED MODE

(71) Applicant: Apple Inc., Cupertino, CA (US)

(72) Inventors: Li Su, San Jose, CA (US); Sami M. Almalfouh, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,242

(22) Filed: Jul. 15, 2019

(65) Prior Publication Data

US 2019/0342856 A1 Nov. 7, 2019

Related U.S. Application Data

(63) Continuation of application No. 15/888,929, filed on Feb. 5, 2018, now Pat. No. 10,356,751.
(Continued)

(51) Int. Cl.
*H04W 68/02* (2009.01)
*H04W 76/27* (2018.01)
(Continued)

(52) U.S. Cl.
CPC .......... *H04W 68/02* (2013.01); *H04W 76/27* (2018.02); *H04W 16/30* (2013.01); *H04W 24/08* (2013.01); *H04W 68/04* (2013.01); *H04W 88/02* (2013.01); *H04W 88/08* (2013.01); *Y02D 70/00* (2018.01); *Y02D 70/10* (2018.01); *Y02D 70/12* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/20* (2018.01);
(Continued)

(58) Field of Classification Search
CPC ..... H04W 68/005; H04W 4/70; H04W 68/02; H04W 76/27; H04W 48/16; H04W 76/10
See application file for complete search history.

(56) References Cited

U.S. PATENT DOCUMENTS 9,356,679 B2 5/2016 Mujtaba et al.
2009/0154607 A1 6/2009 Lindhoff et al.
(Continued)

FOREIGN PATENT DOCUMENTS

WO WO 2017/051078 3/2017

*Primary Examiner* — Nam T Huynh
(74) *Attorney, Agent, or Firm* — Kowert Hood Munyon Rankin and Goetzel PC; Jeffrey C. Hood; Luke S. Langsjoen

(57) ABSTRACT

This disclosure relates to techniques for efficient idle mode wakeup for wireless devices supporting an enhanced coverage mode and a normal coverage mode in a wireless communication system. A wireless device may camp on a cellular base station in idle mode. The wireless device may monitor a control channel associated with the normal coverage mode during a paging occasion. The wireless device may also monitor a control channel associated with the enhanced coverage mode during the paging occasion if a paging indication is not successfully decoded on the control channel associated with the normal coverage mode.

20 Claims, 7 Drawing Sheets

Related U.S. Application Data

(60) Provisional application No. 62/471,507, filed on Mar. 15, 2017, provisional application No. 62/456,947, filed on Feb. 9, 2017.

(51) Int. Cl.
- *H04W 88/08* (2009.01)
- *H04W 88/02* (2009.01)
- *H04W 68/04* (2009.01)
- *H04W 16/30* (2009.01)
- *H04W 24/08* (2009.01)

(52) U.S. Cl.
CPC .............. *Y02D 70/21* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2014/0098761 A1 | 4/2014 | Lee et al. |
| 2016/0095076 A1 | 3/2016 | Xiong et al. |
| 2016/0205659 A1 | 7/2016 | Bergman et al. |
| 2016/0302174 A1 | 10/2016 | Chatterjee et al. |
| 2017/0013391 A1 | 1/2017 | Rico Alvarino et al. |

EFFICIENT PAGING AND IDLE MODE WAKEUP FOR WIRELESS DEVICES SUPPORTING COVERAGE ENHANCED MODE

PRIORITY INFORMATION

This application is continuation of U.S. application Ser. No. 15/888,929, entitled "Efficient Paging and Idle Mode Wakeup for Wireless Devices Supporting Coverage Enhanced Mode" and filed Feb. 5, 2018, which claims priority to U.S. provisional patent application Ser. No. 62/456,947, entitled "Efficient Paging and Idle Mode Wakeup for Wireless Devices Supporting Coverage Enhanced Mode," filed Feb. 9, 2017, and to U.S. provisional patent application Ser. No. 62/471,507, entitled "Efficient Paging and Idle Mode Wakeup for Wireless Devices Supporting Coverage Enhanced Mode," filed Mar. 15, 2017, each of which are hereby incorporated by reference in their entirety as though fully and completely set forth herein.

TECHNICAL FIELD

The present application relates to wireless communication, including to techniques for efficient paging and idle mode wakeup for wireless devices supporting coverage enhanced mode in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for efficient paging and idle mode wakeup for wireless devices supporting coverage enhanced mode in a wireless communication system.

According to some of the embodiments described herein, a cellular base station may select a paging arrangement to use from among multiple possible paging arrangements. The paging arrangement used may depend at least in part on cell loading or other considerations that may be specific to the cellular base station. For example, if not particularly loaded, it may be possible for the cellular base station to use an arrangement whereby a control channel associated with enhanced coverage conditions may always be used for paging. With such an arrangement, devices served by the base station may have a relatively likelihood of being able to detect and decode paging indications. Alternatively, if the base station is relatively loaded (e.g., such that always using the control channel associated with enhanced coverage conditions for paging may be difficult), an alternative arrangement may be used.

The alternative arrangement may include attempting to page on one control channel initially, and subsequently attempting to page on another control channel, e.g., if attempts to page on the initial control channel are unsuccessful. The order in which the control channels are used for paging attempts may be selected based on which control channel is considered most likely to be monitored by the wireless device being paged, on which control channel the wireless device being paged is considered most likely to be able to successfully detect and decode a paging indication, and/or based on any of various other possible considerations.

At least in some instances, a wireless device may adapt how it performs page monitoring based on the cellular base station's selected paging arrangement. For example, if an arrangement in which a control channel associated with enhanced coverage conditions is always used for paging, the wireless device may always monitor that control channel. If an alternative arrangement in which the base station may initially attempt to page on one control channel and may subsequently attempt to page on another control channel if unsuccessful on the initial control channel, the wireless device may monitor both control channels that may potentially be used.

Additionally or alternatively, the wireless device may select a control channel to monitor for paging indications based on its current coverage conditions. For example, if the base station will initially attempt to page on one control channel and subsequently attempt to page on another control channel if unsuccessful on the initial control channel, and the wireless device is in poor coverage conditions such that the wireless device can determine that it would be unlikely to be capable of detecting and/or decoding a paging indication on a control channel associated with normal coverage conditions, the wireless device may forego monitoring that control channel and only monitor a control channel associated with enhanced coverage conditions.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
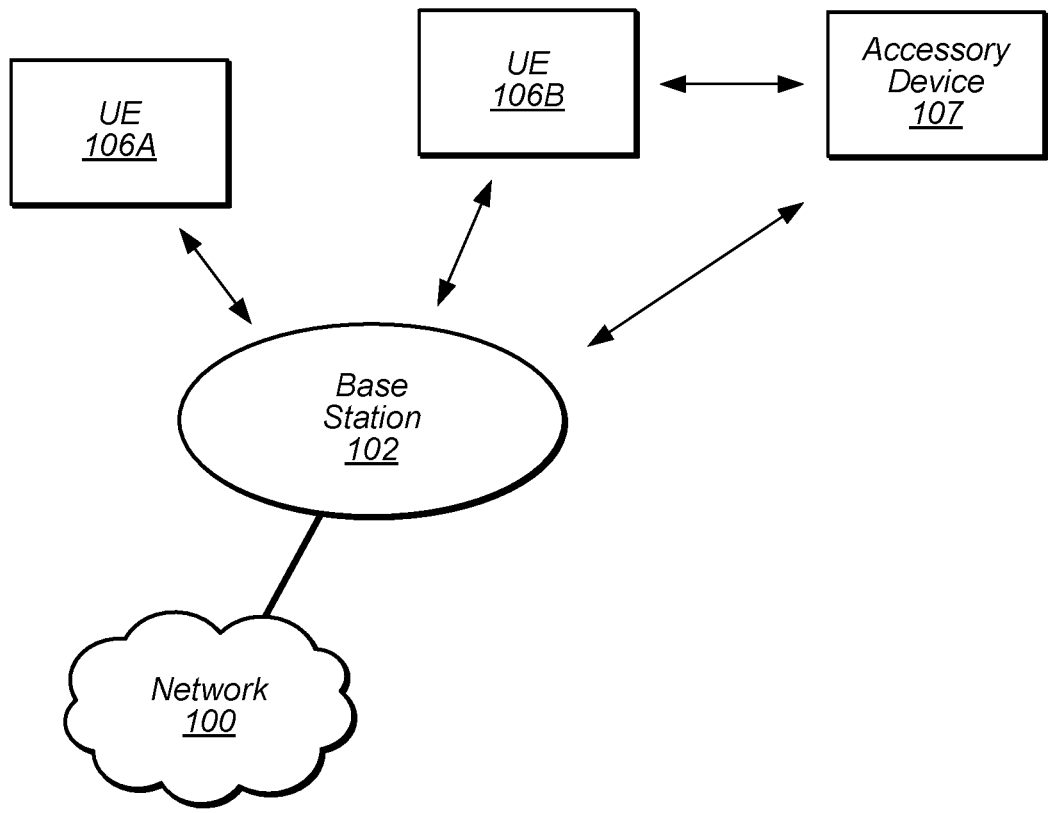
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices which perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
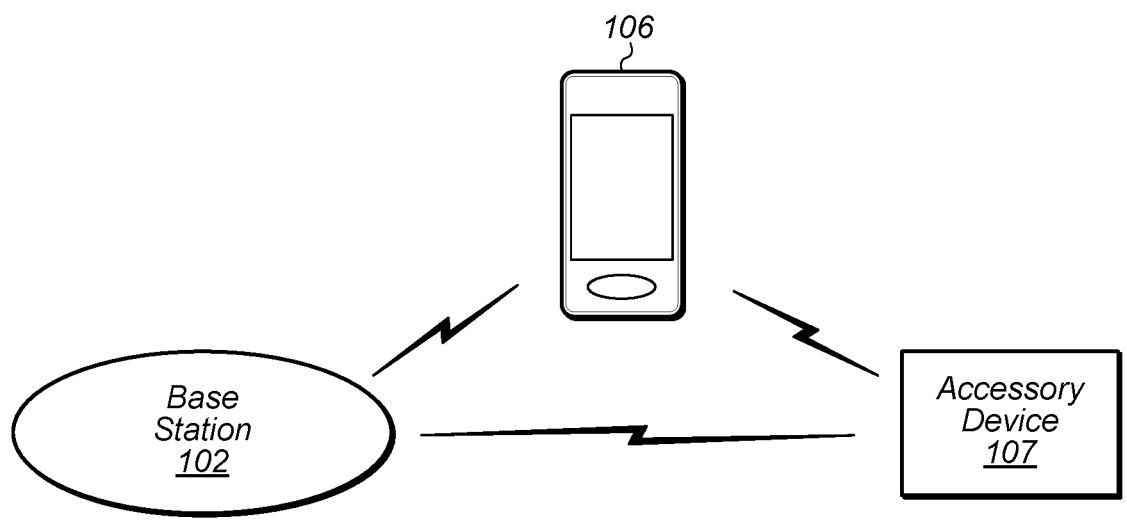
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G-NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
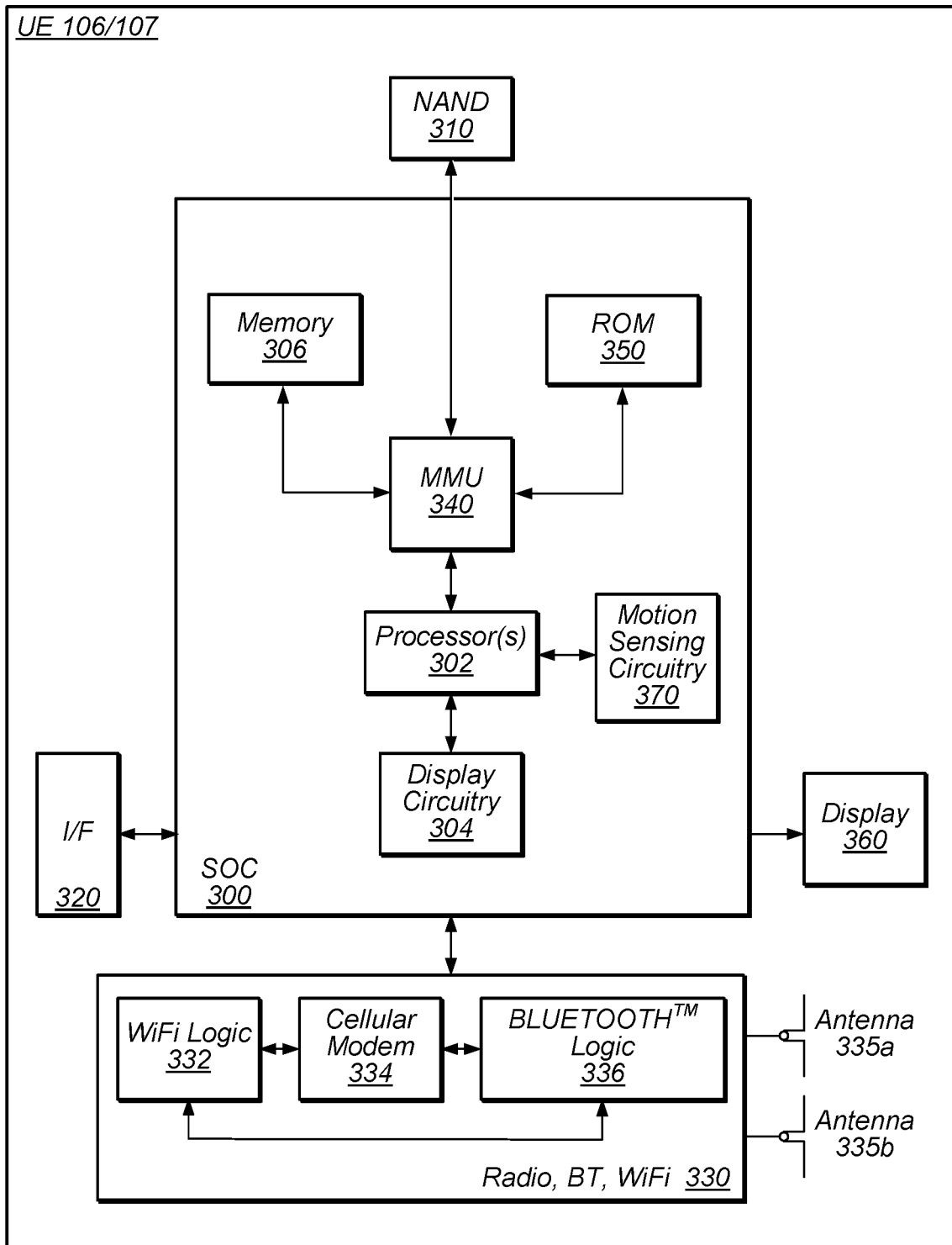
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
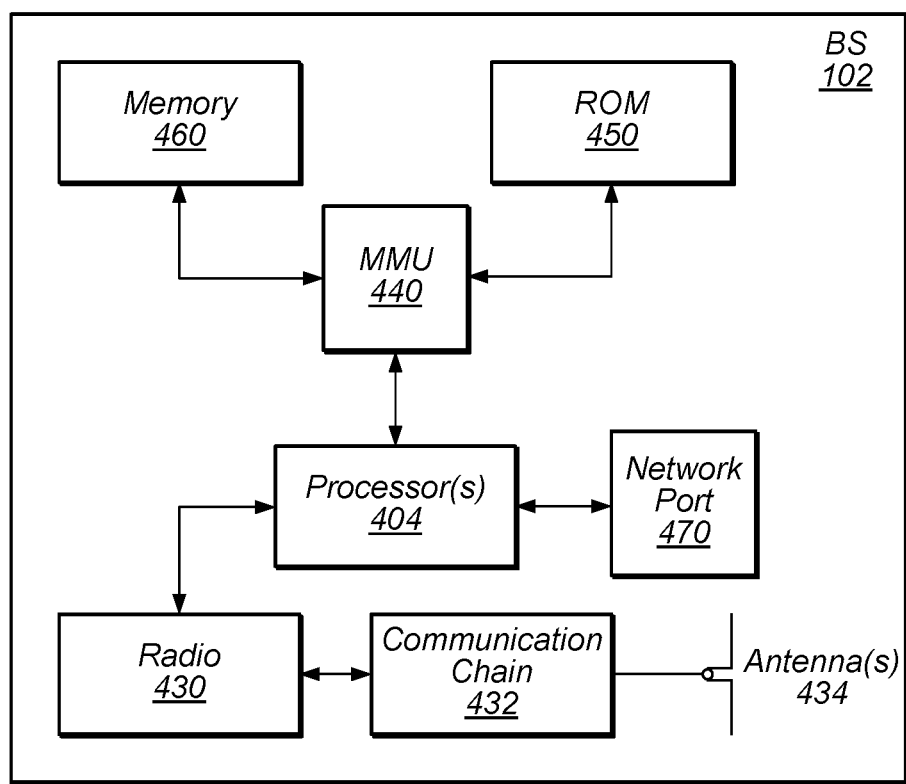
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIGS. 5-8—Example Coverage Modes, Communication Flow Diagrams, and Idle Mode Wakeup Timeline As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for many such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or efficiency level of antennas, battery capability, communication range, etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support link budget limited devices (e.g., in addition to those wireless devices that are not link budget limited).

Figure 5:
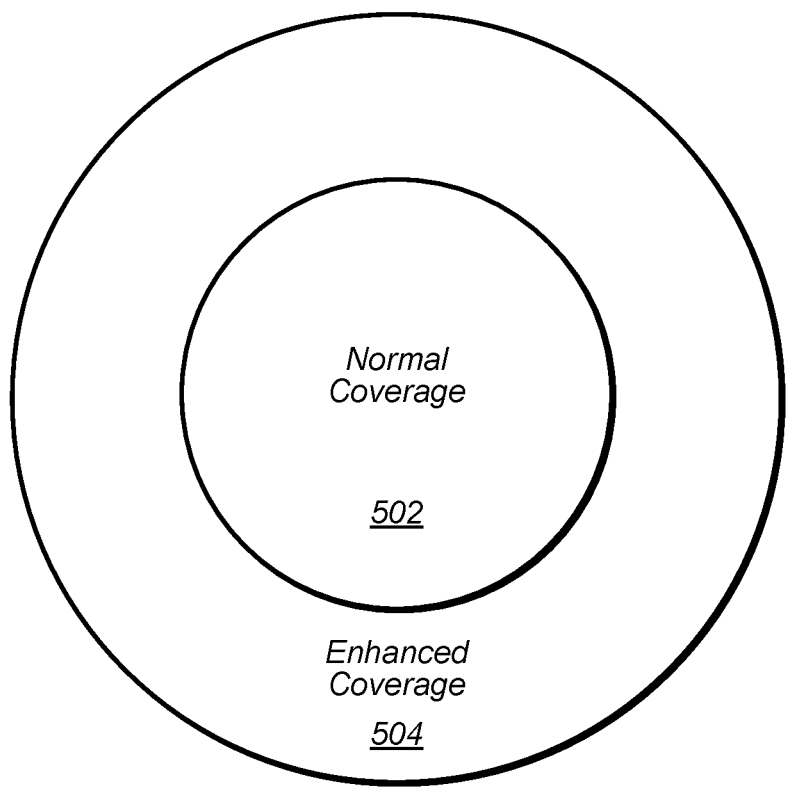
FIG. 5 illustrates examples of possible normal and extended coverage cell ranges, according to some embodiments.

For example, at least some cellular communication systems may be capable of providing multiple coverage modes, e.g., to help accommodate wireless devices with different communication capabilities and/or operating in different radio conditions. Such coverage modes could include a normal coverage mode (e.g., for wireless devices experiencing good radio conditions) along with one or more enhanced coverage modes (e.g., for wireless devices experiencing varying degrees of poorer radio conditions, whether as a result of inherent device capabilities, current conditions, or some combination thereof), as one possibility. FIG. 5 illustrates one example of possible different approximate coverage ranges associated with different coverage modes that could be offered by a cellular base station operating in a cellular communication system, according to some embodiments. As shown, in this example, the communication range at which normal coverage 502 is available may be smaller than the communication range at which enhanced coverage 504 is available. At least in some instances, any or all of the features of the different coverage modes may differ, including but not limited to communication bandwidth, maximum uplink throughput, maximum downlink throughput, and/or any of various other features.

In many instances a wireless device may predominantly or exclusively operate in just one of the coverage modes offered; for example, a MTC device in a stationary deployment might always operate in an enhanced coverage mode based on its particular combination of device characteristics and typical radio conditions with its serving cell, as one possibility. However, as part of the increasing breadth of device capabilities and intended uses, at least some subset of wireless devices may benefit from being provided the possibility of using different coverage modes at different times. For example, a device may be better served by different coverage modes at different times based on any or all of current radio conditions, a type of communication currently being performed, user preference features currently enabled with respect to power saving and/or other device characteristics, etc. For such devices, providing techniques for switching between different coverage modes may improve operating efficiency, e.g., by extending service coverage range and/or reducing power consumption.

As an example, 3GPP Release 13 defines various categories of UEs, according to which category 1 and above devices may be capable of supporting coverage enhanced (CE) features, and may also be capable of supporting normal mode features.

One feature that may differ between such different coverage modes, at least according to some embodiments, may include a type of control channel that is used to schedule uplink and/or downlink communications for a wireless device. For example, as one possibility, the 3GPP rel. 13 normal coverage mode may typically use a physical downlink control channel (PDCCH) that may span up to 20 MHz for paging (e.g., when in idle mode) and/or to provide uplink and downlink grants to a wireless device (e.g., when in connected mode), while the 3GPP rel. 13 CE mode may typically use a MTC PDCCH (mPDCCH) that may span 1.4 MHz for paging and/or to provide uplink and downlink grants to a wireless device. In this example, when a wireless device is in normal coverage mode, it may listen for pages on the PDCCH when in idle mode, and when a wireless device is in enhanced coverage mode, it may listen for pages on the mPDCCH. Note that various additional or alternative control channels may also be possible, such as an enhanced PDCCH (E-PDCCH), among other possibilities. For example, such an E-PDCCH may be wider in bandwidth than the mPDCCH while also being narrower in bandwidth than the PDCCH, according to some embodiments.

Based at least in part on the different bandwidths of the PDCCH and the mPDCCH (and/or other possible control channels), and also based on the current radio conditions experienced, there may be substantial detectability, effective round trip time, and/or power usage differences for wireless devices monitoring the PDCCH for paging information versus monitoring the mPDCCH for paging information. Particularly for the time that a wireless device spends in idle mode, when a wireless device may not be regularly informing the network of its current radio conditions, there may thus be substantial potential benefit to be gained by having the ability to seamlessly adjust whether paging is performed on a control channel with features intended for normal coverage conditions, such as the PDCCH, and monitoring a control channel with features intended for enhanced coverage conditions, such as the mPDCCH.

Figure 6:
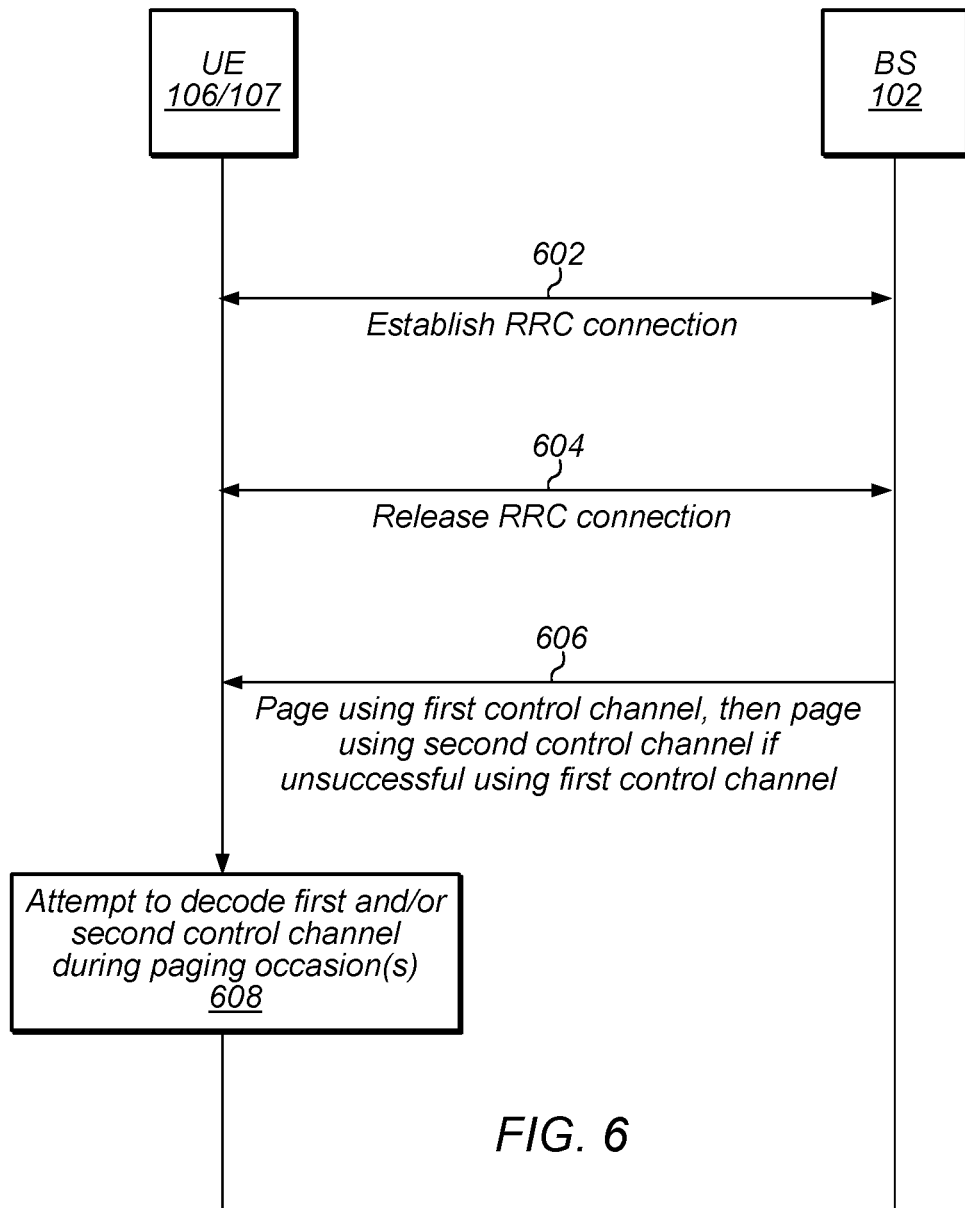
FIGS. 6-7 are communication flow diagrams illustrating example methods for efficient paging for a wireless device supporting coverage enhanced mode, according to some embodiments.

Accordingly, FIG. 6 is a flowchart diagram illustrating one possible example of a method for performing idle mode paging for a wireless device with dynamic paging channel adjustment, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3 and/or a BS 102 such as illustrated in and described with respect to FIGS. 1, 2, and 4, or more generally in conjunction with any of the computer systems or devices shown in the above Figures, among other devices, as desired. Note that while at least some elements of the method of FIG. 6 are described in a manner relating to the use of communication techniques and/or features associated with LTE and/or 3GPP specification documents, such description is not intended to be limiting to the disclosure, and aspects of the method of FIG. 6 may be used in any suitable wireless communication system, as desired. As shown, the method may operate as follows.

In 602, the UE and the BS may establish a radio resource control (RRC) connection. The RRC connection may be established after the UE initially camps on a serving cell provided by the cellular base station, according to some embodiments. The serving cell may provide cellular communication service according to a wireless communication technology (or "radio access technology" or "RAT"), such as LTE, 5G-NR, UMTS, CDMA2000, etc. To camp on the serving cell, the wireless device may detect that the serving cell exists, obtain timing synchronization and decode system information for the serving cell, and attach to the cell (e.g., by performing an attachment procedure), according to some embodiments. The RRC connection may be established by way of a random access channel (RACH) procedure performed while operating in an idle mode, according to some embodiments, or in any of various other possible manners.

While in the RRC connected mode, the UE may operate in a normal coverage mode or an enhanced coverage mode. According to some embodiments, during a normal mode RRC connection, the PDCCH may be used for physical layer (also referred to as layer 1 or L1) signaling to schedule uplink and downlink grants, uplink hybrid automatic repeat request (HARQ) transmission may be synchronous HARQ, and downlink HARQ transmission may be asynchronous HARQ. Additionally, during a CE mode RRC connection, the mPDCCH may be used for physical layer signaling to schedule uplink and downlink grants, uplink HARQ transmission may by asynchronous HARQ, and downlink HARQ transmission may be asynchronous HARQ.

The serving cell may provide the wireless device with a communication link to a cellular network, such as a core network of a cellular service provider (e.g., with which a user of the wireless device may have a subscription and/or other agreement to provide cellular service). When operating in connected mode with the serving cell, the cellular network may thus provide connectivity between the user device and various services and/or devices coupled to the cellular network, such as other user devices, a public switched telephone network, the Internet, various cloud-based services, etc. A variety of possible data types, with different characteristics, may be transmitted via the serving cell. In addition, various signaling messages may be exchanged at various times to establish, maintain, reconfigure, and/or otherwise provide signaling functionality between the wireless device and the serving cell.

Eventually, in 604, the BS and the UE may release the RRC connection. When the RRC connection is released, the network MME supporting the BS and the UE may save the status of the UE with respect to whether the UE is in normal coverage or enhanced coverage in the UE's MME context. Thus, as one (e.g., default) option, when subsequently the network has a paging message for the UE, the network may attempt to page the UE using the control channel (e.g., PDCCH or mPDCCH) associated with the UE's most recent coverage mode. However, in many circumstances (e.g., due to UE mobility, load, and/or other factors), the actual coverage conditions of the UE may change while in idle mode, such that the UE might sometimes be in normal coverage conditions while the network still considers the UE to be in enhanced coverage mode, or in enhanced coverage conditions while the network still considers the UE to be in normal coverage mode.

When a UE moves from enhanced coverage conditions to normal coverage conditions, the UE may still be able to decode pages on the mPDCCH, but when a UE moves from normal coverage conditions to enhanced coverage conditions, the UE may be more likely to miss paging attempts performed using the PDCCH. One possible solution for this could be for the UE to update the network to change its coverage mode status when coverage conditions change from normal to enhanced (e.g., by establishing a RRC connection and performing a tracking area update (TAU), as one possibility), so the MME normal/enhanced mode status can be updated, and subsequent pages can be provided using the mPDCCH. However, such a solution introduces additional signaling load to the network.

As another possible solution, it may be possible for the network to begin paging a UE that is in idle mode using one control channel, and automatically switch to the other control channel if the initial attempt(s) are unsuccessful. This may allow the network to accommodate UEs that move between different coverage conditions when in idle mode without requiring any additional signaling.

Thus, in 606, the BS may page the UE using a first control channel, then may page the UE using a second control channel if the attempt(s) to page the UE using the first control channel are unsuccessful. The first control channel may be the control channel associated with the coverage mode that the network expects that the UE is in. For example, if the UE is in the enhanced coverage mode (e.g., according to the MME context for the UE), the control channel associated with the enhanced coverage mode (e.g., the mPDCCH) may initially be used to attempt to provide a paging indication to the UE, while if the UE is in the normal coverage mode (e.g., according to the MME context for the UE), the control channel associated with the normal coverage mode (e.g., the PDCCH) may initially be used to attempt to provide a paging indication to the UE. Alternatively, the first control channel may always be the control channel associated with the normal coverage mode, or may always be the control channel associated with the enhanced coverage mode, if desired. The BS may perform multiple attempts to page the UE using the first control channel if a first attempt is unsuccessful, according to some embodiments, e.g., up to a specified maximum number of attempts for the first control channel.

If the attempt(s) to page the UE using the first control channel are unsuccessful (e.g., the UE does not respond), the BS may perform one or more attempts to page the UE using the second control channel. The second control channel may be the control channel not associated with the coverage mode that the network expects that the UE is in. For example, if the UE is in the enhanced coverage mode (e.g., according to the MME context for the UE), the control channel associated with the normal coverage mode (e.g., the PDCCH) may be the second control channel used to attempt to provide a paging indication to the UE, while if the UE is in the normal coverage mode (e.g., according to the MME context for the UE), the control channel associated with the enhanced coverage mode (e.g., the mPDCCH) may be the second control channel used to attempt to provide a paging indication to the UE. Alternatively, the second control channel may always be the control channel associated with the enhanced coverage mode, or may always be the control channel associated with the normal coverage mode (e.g., such that the second control channel is a different control channel than the first control channel), if desired. The BS may perform multiple attempts to page the UE using the second control channel if a first attempt is unsuccessful, according to some embodiments, e.g., up to a specified maximum number of attempts for the second control channel.

According to some embodiments, the BS may increase the aggregation level and/or power boost to increase the UE's decoding success rate for each successive attempt to page the UE on the first control channel and/or on the second control channel. For the mPDCCH, the number of repetitions used may also or alternatively be increased for successive attempts to page the UE, at least in some instances.

Note that the BS may be attempting to page the UE based on an indication to page the UE that the BS receives from a MME. The indication to page the UE may include an indication of the coverage mode of the UE, based on which the BS may determine on which control channel to initially attempt to page the UE. In some embodiments, the MME may also indicate how many previous attempts to page the UE have occurred. In such a case, the BS may determine on which control channel to attempt to page the UE based at least in part on the number of previous attempts to page the UE that have occurred. For example, if the BS would normally initially page the UE using the first control channel for two attempts, but two (or more) attempts to page the UE have previously been made (e.g., by other base stations in the vicinity), the BS may skip attempting to page the UE using the first control channel, and may instead attempt to page the UE using the second control channel.

In 608, the UE may attempt to decode the first and/or second control channel during one or more paging occasions. At least according to some embodiments, the paging occasion subframe for a UE may be determined in the same manner for both control channels on which paging can occur. For example, the paging occasion subframe in idle discontinuous reception (DRX) may be based on the international mobile subscriber identity (IMSI) of a UE for both paging on the PDCCH and the mPDCCH, according to some embodiments.

According to some embodiments, the UE may first attempt to decode the control channel associated with the normal coverage mode during a paging occasion. For example, the PDCCH may generally be located in the first 3 orthogonal frequency division multiple access (OFDMA) symbols of a subframe, so the UE may first attempt to decode its paging radio network temporary identifier (P-RNTI) on the PDCCH. If the P-RNTI is decoded on the PDCCH, this may serve as a paging indication (i.e., the UE's UE_ID may be paged on the PDCCH), and the UE can decode the PDSCH in the same subframe to obtain the paging message. Note that in this (successful) case, the UE may not need to attempt to decode the control channel associated with the enhanced coverage mode.

If decoding the control channel associated with the normal coverage mode is unsuccessful (e.g., the P-RNTI is not decoded on the PDCCH), however, the UE may attempt to decode the control channel associated with the enhanced coverage mode during the same paging occasion. For example, the mPDCCH may generally be located on a 6PRB Paging Narrow Band specific to the UE (e.g., which may also be based on its IMSI) on the OFDMA symbols other than those symbols occupied by the PHICH and PDCCH in the same subframe, such that it may be possible to attempt to decode the mPDCCH in the same subframe as a UE attempts to decode the PDCCH. Note that the UE may be able to switch its RF front end from a wideband configuration (e.g., up to 20 MHz) to a narrowband configuration (e.g., 1.4 MHz or 6 physical resource blocks (PRBs)) and a single antenna configuration to decode the mPDCCH after unsuccessfully attempting to decode the P-RNTI on the PDCCH.

If the P-RNTI is not decoded on the mPDCCH in the first subframe, the UE may compare the signal strength for the mPDCCH with a signal strength threshold. For example, as one possibility, the UE may determine whether the mPDCCH log likelihood ratio (LLR) signal to noise ratio (SNR) is greater than or less than a certain threshold. The threshold value may be selected by the UE, or indicated (e.g., in configuration information) by the network, or specified in standards documents, according to various embodiments. The threshold value may be selected as a value above which a UE may have a high likelihood of being able to successfully decode the P-RNTI if provided on the mPDCCH. Thus, if the signal strength (e.g., LLR SNR) is higher than the threshold, and the UE does not successfully decode a paging indication on the control channel associated with the enhanced coverage mode (e.g., the P-RNTI is not decoded on the mPDCCH), the UE may determine that there is no paging indication from the cellular base station for the paging occasion. In this case, the UE may enter a sleep mode, e.g., until the next paging or other wakeup occasion for the UE.

If, however, the signal strength (e.g., LLR SNR) is lower than the threshold, the UE may also attempt to decode the control channel associated with the enhanced coverage mode in the subsequent subframe (e.g., the second subframe of the paging occasion). Additionally, the UE may perform soft combining of the control channel associated with the enhanced coverage mode received in the first subframe of the paging occasion with the control channel associated with the enhanced coverage mode received in the second subframe of the paging occasion, e.g., to increase the LLR SNR and increase the likelihood of successfully decoding a paging indication (if provided). Depending on the result of this attempt to decode the control channel (e.g., successful or unsuccessful decoding and the signal strength after soft combining), the UE may determine that there is no paging indication from the cellular base station for the paging occasion (e.g., if unsuccessful at decoding and signal strength after soft combining is above the signal strength threshold), or may continue to attempt to decode the control channel associated with the enhanced coverage mode in subsequent subframes (e.g., continuing to use soft combining to increase effective signal strength), potentially up to a maximum configured number of repetitions of the control channel associated with the enhanced coverage mode (e.g., if unsuccessful at decoding and signal strength after soft combining is still below the signal strength threshold), or may attempt to decode the PDSCH in a specified subsequent subframe (or over multiple subframes, e.g., depending on channel conditions and the number of PDSCH repetitions used by the BS) to obtain the paging message (e.g., if successful at decoding the P-RNTI on the mPDCCH).

Thus, a UE may generally be able to attempt to decode either or both of the control channel associated with the normal coverage mode and the control channel associated with the enhanced coverage mode on each paging occasion. This may provide a high likelihood that a UE is able to receive paging messages in a variety of channel conditions without burdening the network with additional signaling to update the status of the UE as its channel conditions change while in idle mode. For example, in a 3GPP context, for category 1 and above UEs with enhanced coverage mode capability, if an eNodeB can page a UE on both the PDCCH and the mPDCCH, and the UE can decode both the PDCCH and mPDCCH on the paging occasion subframe(s) in each of its idle DRX cycles, the UE may be able to forego providing a TAU when the UE moves from normal coverage conditions to enhanced coverage conditions, such that no extra signaling load may be placed on the network.

Note that although a UE may attempt to decode both control channels on paging occasions, as described above herein, under some conditions, a UE may also be capable of choosing to selectively not decode one of the control channels on a paging occasion under some conditions. For example, a UE that is aware that it is in enhanced coverage conditions may choose not to attempt to decode the PDCCH, since based on the coverage conditions the UE might be unlikely to succeed at decoding the PDCCH. Similarly, a UE may choose not to perform a check for whether signal strength is above the signal strength threshold after an unsuccessful attempt to decode the mPDCCH if desired, and may simply proceed to attempt to decode the mPDCCH at the next repetition/subframe, until successful or until the maximum number of mPDCCH repetitions is reached, e.g., depending on the coverage conditions for the UE. Alternatively, a UE may be configured to always monitor the PDCCH first, and/or to always perform a check for whether signal strength is above the signal strength threshold after an unsuccessful attempt to decode the mPDCCH, regardless of the current coverage conditions for the UE, if desired.

As previously discussed herein, for a UE that is technically capable of decoding paging indications on the PDCCH and on the mPDCCH while in idle mode, there may (e.g., depending on coverage conditions) be scenarios in which the UE can reliably decode paging indications and messages provided by way of the PDCCH or provided by way of the mPDCCH, as well as scenarios in which the UE can decode paging indications and messages provided by way of the mPDCCH but cannot reliably decode paging indications and messages provided by way of the PDCCH. For example, in normal coverage, a UE may be able to reliably decode a P-RNTI on the PDCCH and a paging message on the PDSCH in the same subframe, and the UE may also be able to reliably decode a P-RNTI on the mPDCCH and a paging message on the PDSCH in one subframe, such that paging the UE on either of the PDCCH or the mPDCCH may be efficient for the UE and its serving base station. In contrast, in extended coverage, a UE may possibly not be able to decode a P-RNTI on the PDCCH and a paging message on PDSCH (e.g., due to lower SNR and/or reference signal received power (RSRP)); but due to mPDCCH and PDSCH repetition in CE mode, the UE may be able to decode a paging indication on the mPDCCH, such that paging the UE on the mPDCCH may be efficient for the UE and its serving base station.

Since a base station may not know a UE's radio condition when the UE is in idle mode, the base station may always page UEs on the mPDCCH as an efficient method for both UEs and the base station. However, due to NW loading and capacity related reasons, among various possible reasons, a base station may not always be able to page UEs in its cell using only the mPDCCH. When such conditions are present, the base station may instead perform paging using a different arrangement, such as an arrangement similar to the paging arrangement described herein with respect to FIG. 6. For example, under some circumstances, the base station may utilize an arrangement in which the base station initially attempts to page a UE using the PDCCH, then after a number of unsuccessful paging attempts, the base station switches to attempting to page the UE on the mPDCCH.

Figure 7:
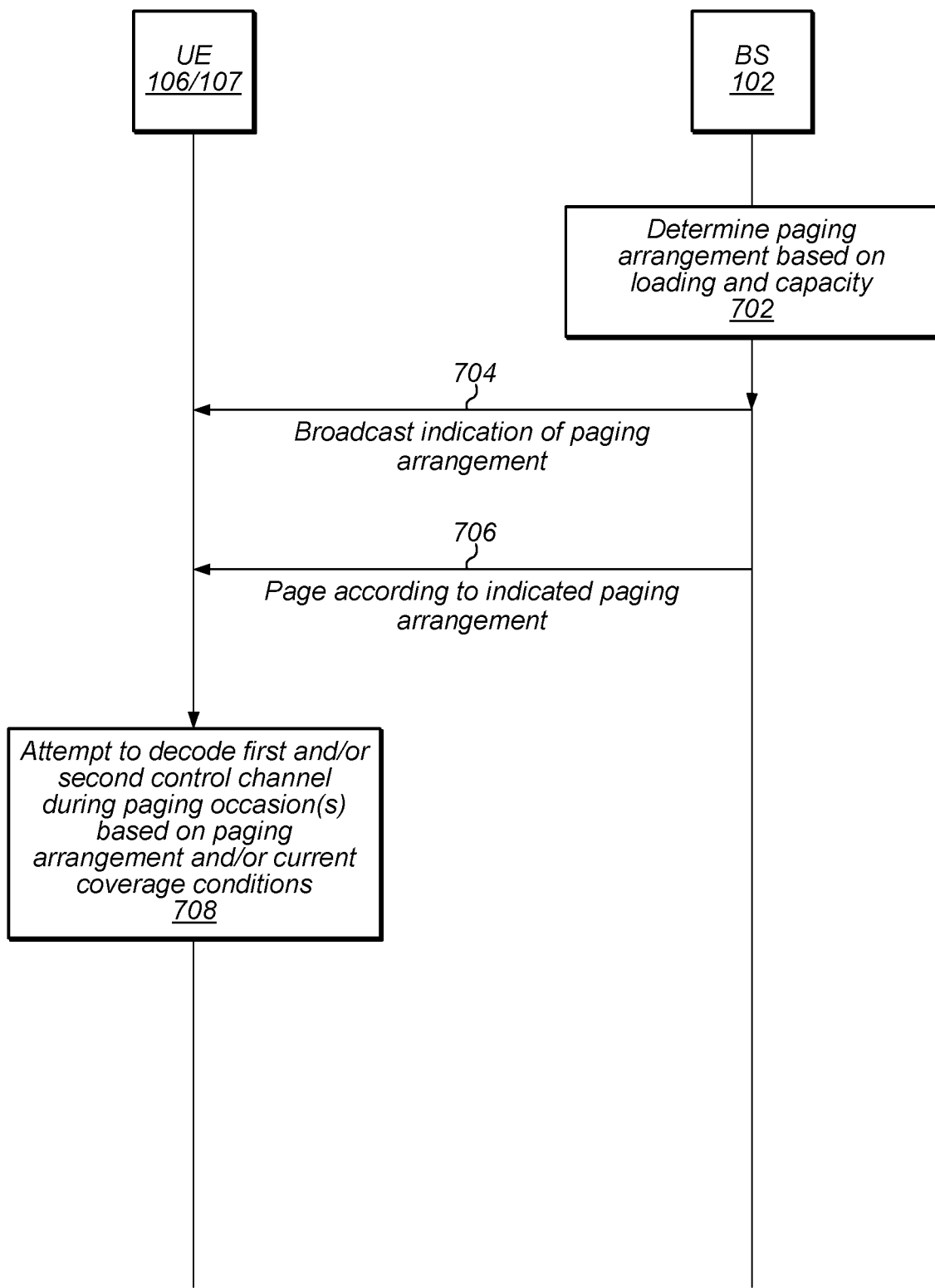

FIG. 7 is a flowchart diagram illustrating one possible example of such a method for performing idle mode paging for a wireless device with dynamic paging arrangement selection, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 7 may be implemented by a wireless device, such as a UE 106 or 107 illustrated in and described with respect to FIGS. 1-3 and/or a BS 102 such as illustrated in and described with respect to FIGS. 1, 2, and 4, or more generally in conjunction with any of the computer systems or devices shown in the above Figures, among other devices, as desired. Note that while at least some elements of the method of FIG. 7 are described in a manner relating to the use of communication techniques and/or features associated with LTE and/or 3GPP specification documents, such description is not intended to be limiting to the disclosure, and aspects of the method of FIG. 7 may be used in any suitable wireless communication system, as desired. As shown, the method may operate as follows.

In 702, the BS may determine a paging arrangement to use when paging UEs served by the BS. The possible paging arrangements may include any of various possible paging arrangements. One possible ("first") paging arrangement may include always performing paging using a certain control channel (e.g., a control channel associated with enhanced coverage conditions, such as the mPDCCH in LTE). Another possible ("second") paging arrangement may include initially peforming paging using a first control channel (e.g., a control channel associated with normal coverage conditions, such as the PDCCH in LTE), and subsequently peforming paging using a second control channel (e.g., a control channel associated with enhanced coverage conditions, such as the mPDCCH in LTE) if paging using the first control channel is unsuccessful. The BS may also or alternatively select from any of various other possible paging arrangements, as desired.

The paging arrangement may be selected based on the current load conditions of the BS, the capacity and/or other characteristics of the BS, and/or any of various other possible considerations. For example, as one possibility, if current loading of the BS is less than the capacity of the BS by a sufficient amount (e.g., if the current loading relative to the capacity is below a first loading threshold), the BS may select the first paging arrangement, while if current loading of the BS is not less than the capacity of the BS by a sufficient amount (e.g., if the current loading relative to the capacity is not below the first loading threshold), the BS may select the second paging arrangement. Alternatively, multiple loading thresholds may be used, e.g., if a hysteresis between the first paging arrangement and the second paging arrangement is desired.

In 704, the BS may broadcast an indication of the selected paging arrangement. The indication may be broadcast as part of system information, for example in a system information block (SIB), such as a SIB2 (e.g., which may include paging control channel (PCCH) configuration information) according to LTE. For example, along with existing information related to paging on the mPDCCH (e.g., paging narrow bands, mPDCCH number of repetitions, etc.), an indication of whether all UEs with CE mode capability should always listen to the mPDCCH for paging may be provided.

As shown, the UE may receive the broadcast indication of the selected paging arrangement. In 706, the BS may further attempt to page the UE according to the indicated paging arrangement.

In 708, the UE may attempt to decode one or both of a first control channel or a second control channel during its paging occasion(s), based on the indicated paging arrangement and/or based on current coverage conditions for the UE.

For example, if the UE is camping on the cell provided by the BS, and if the broadcast indication of the paging arrangement includes a TRUE indication for the "always page on mPDCCH" field, the UE may listen for pages on the mPDCCH, potentially without listening for pages on the PDCCH, e.g., regardless of whether the UE is experiencing normal coverage conditions or enhanced coverage conditions.

Alternatively, if the broadcast indication of the paging arrangement includes a FALSE indication for the "always page on mPDCCH" field, the UE may listen to both the PDCCH and the mPDCCH if the UE is in normal coverage conditions, or, if the UE is in enhanced coverage conditions, the UE may only listen for pages on the mPDCCH.

Note that the base station may determine to change the paging arrangement used, e.g., at a later time, based on changing cell loading conditions and/or other consideration. For example, after initially determining to use the first paging arrangement based on loading conditions being below a loading threshold associated with the first paging arrangement, the BS may later determine that loading conditions have increased above a loading threshold associated with the second paging arrangement, and may determine to switch to the second paging arrangement. In this case, the BS may provide a broadcast indication of the newly selected paging arrangement (e.g., at the next opportunity to update the SIB2, if the broadcast indication is provided in the SIB2), and once the BS has indicated the newly selected paging arrangement, the BS may subsequently perform paging according to the newly selected paging arrangement. Additionally, UEs receiving the broadcast indication of the newly selected paging arrangement may likewise modify their paging behavior in accordance with the indicated paging arrangement.

As noted previously herein, according to some embodiments, a BS may provide some configured number of repetitions of each of the mPDCCH (e.g., used to transmit paging indications) and the PDSCH (e.g., used to transmit paging messages) when a UE is operating in enhanced coverage mode. Since, at least in some instances, it may be possible for a BS to attempt to page a UE using the mPDCCH when the UE has moved to normal/good channel conditions, this may result in a UE successfully decoding the mPDCCH and PDSCH using fewer than the configured number of repetitions, including potentially using only the first transmission of each. In this case, the UE may be able to enter a sleep mode between the mPDCCH and PDSCH subframes. Even in bad channel conditions, in some instances a UE may enter sleep mode between the mPDCCH and PDSCH subframes, e.g., if enough of a gap exists between the subframe in which the UE successfully decodes the mPDCCH transmission and the subframe that it is scheduled to receive the PDSCH transmission from the network.

Figure 8:
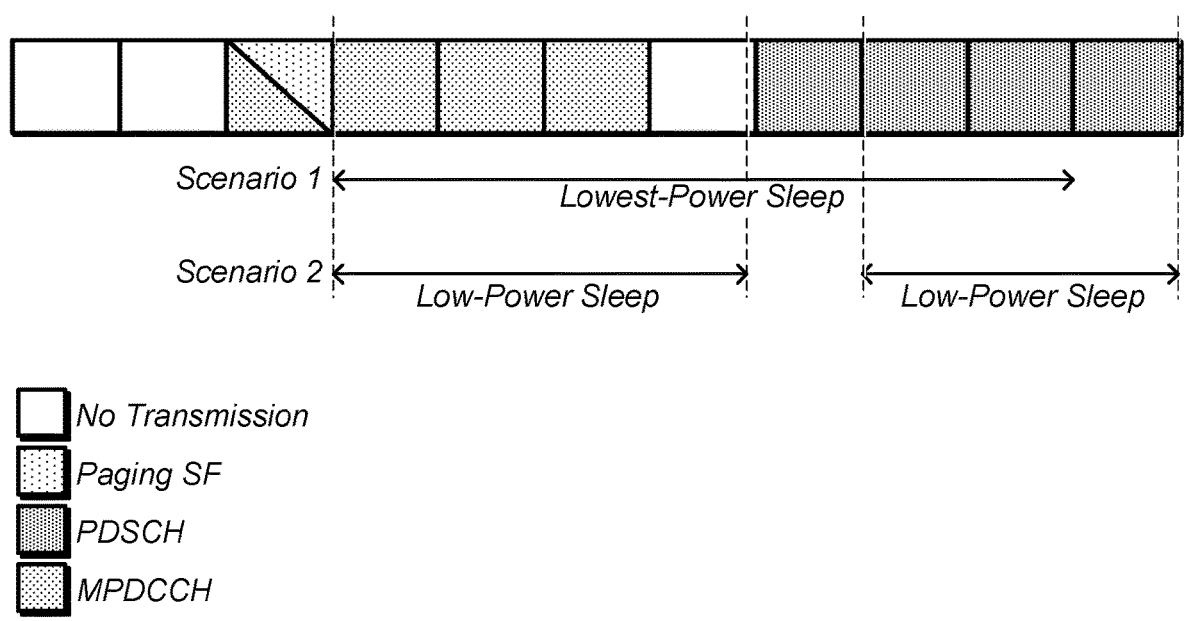
FIG. 8 is a timing diagram illustrating various possible idle mode wakeup timing scenarios for decoding paging messages provided on the mPDCCH, according to some embodiments.

FIG. 8 illustrates an exemplary possible mPDCCH/PDSCH transmission arrangement with various possible idle mode wakeup timelines according to which a UE could operate, according to some embodiments. In particular, the scenarios illustrated may represent possible idle mode wakeup timelines for a UE that is in channel conditions sufficient to successfully decode the mPDCCH and PDSCH using a single transmission of each.

In 'scenario 1', the sleep duration can be adapted based on the decode performance of the mPDCCH and the estimated channel conditions (e.g., SNR, RSRP, RSRQ, etc.). The UE can then project its expected PDSCH decode performance, and then can wakeup only for the last x repetitions (e.g., where x=1 in the illustrated example) of the PDSCH transmissions. Scenario 1 may be well suited for situations when a medium or large number of repetitions are being provided while the UE is in good channel conditions, for example since it may allow the UE to enter a deeper ('lowest-power') sleep, and may thus reduce UE power consumption in such situations.

In 'scenario 2', the UE may enter a ('low-power') sleep mode after successful decoding of the mPDCCH (e.g., after 1 transmission in the illustrated example, although in other instances different numbers of repetitions may be required), and may wakeup for the first repetition of the PDSCH. Once the PDSCH is successfully decoded, the UE may re-enter the sleep mode during the remaining PDSCH repetition subframes. Scenario 2 may be well suited for situations when a small number of repetitions are being provided while the UE is in good channel conditions, or when a large number of repetitions are being provided while the UE is in bad channel conditions and it may take the UE several repetition subframes to successfully decode the mPDCCH and PDSCH, for example since in such situations the gap duration for sleep may be too small to enter the deeper ('lowest-power') sleep state in any case.

According to some embodiments, in the 'lowest-power' sleep mode, the UE may be able to power off more power-consuming radio and baseband components than may be possible or preferred for the 'low-power' sleep; in the 'low-power' sleep mode, the UE may be able to power off some radio and baseband components, but other components may remain powered on, e.g., as the sleep duration may be shorter than for the 'lowest-power' sleep mode.

Another possible consideration with respect to idle mode wakeup timing for paging occasions may relate to dual subscriber identity module (SIM) dual standby (DSDS) systems. In a DSDS system, a UE may include two SIMs, and may be capable of concurrently operating in idle mode using both of the SIMs. Thus, a UE could be attached to a network using one RAT (e.g., GSM, UMTS (W-CDMA or TDS-CDMA), CDMA2000, LTE, NR, etc.) while also attached to a network using another (same or different) RAT. In such a scenario, there may be a possibility that both RATs' paging occasion subframes conflict/collide (e.g., occur at the same time) for the UE.

In such a scenario, if one of the RATs provides paging information using a control channel that provides some number of repetitions, such as the mPDCCH according to LTE R13, the UE may be able to manage its idle mode wakeup timing such as to mitigate the effect of the paging occasion conflict between the RATs. For example, consider a DSDS UE that includes an LTE SIM in normal coverage conditions but operating in enhanced coverage mode, such that paging indications are provided on the mPDCCH with a repetition level N and paging messages are provided on the PDSCH with a repetition level M for that SIM. Consider further that the UE has a conflict between the paging occasions of its LTE SIM and the RAT of its other SIM. Such a UE may choose to observe the paging occasion for the other RAT, and to begin attempting to decode the mPDCCH at any of the N subframes in which a repetition of the mPDCCH is provided that does not conflict with the paging occasion subframe of the other RAT. Alternatively, if the paging occasion conflict occurs between the paging occasion subframe of the other RAT and a subframe on which the paging message is provided on the PDSCH (e.g., after a P-RNTI is successfully decoded on the mPDCCH, indicating that there is a paging message for the UE), the UE may choose to begin attempting to decode the PDSCH at any of the M subframes in which a repetition of the PDSCH is provided that does not conflict with the paging occasion subframe of the other RAT.

Thus, a UE may be configured to modify its paging occasion wakeup and/or monitoring timing for a RAT that provides multiple paging indication and/or message repetitions in response to detecting a paging occasion conflict with another RAT when the UE is operating in a DSDS mode, if desired. This may allow the UE to effectively observe the paging occasions for both of its RATs despite the paging occasion conflict, at least according to some embodiments.

Furthermore, at least in some instances, a DSDS UE may be configured to choose to operate in an enhanced coverage mode with respect to a SIM RAT (e.g., an LTE SIM) that is so capable based at least in part on being a DSDS UE, e.g., to allow the UE to make use of the control channel repetition level provided when in the enhanced coverage mode, to potentially save DSDS system power consumption, and/or for any of various other reasons. Such a DSDS UE might make such a selection further based on the UE's power condition/battery level, currently active application(s) (e.g., VoLTE, low throughput or high throughput applications, etc.), and/or any of various other considerations, according to some embodiments. Note further that such a DSDS UE may be configured to actively manage whether the UE operates in the enhanced coverage mode or the normal coverage mode when in idle mode and/or when in connected mode.

Additional Information

The following information includes possible details of LTE release 13 enhanced coverage mode characteristics and parameters, is provided for exemplary illustrative purposes, and is not intended to be limiting to this disclosure as a whole.

A wireless device may be categorized according to its device category with respect to LTE, according to some embodiments. For example, consider a category 1 LTE device, e.g., a device that is UL Category 1 and DL category 1. For such a device, a e-HARQ-pattern-FDD-r12 parameter may define whether the UE supports an enhanced HARQ pattern for TTI bundling operation for FDD, e.g., with 4 TTI bundling, 3 HARQ processes, and round trip time (RTT) of 12 ms. A ce-ModeA-r13 parameter may define whether the UE supports operation in CE mode A and PRACH CE level 0 and 1 at Random Access. A intraFreqA3-CE-ModeA-r13 parameter may define whether the UE when operating in CE mode A supports eventA3 for intra neighboring cells in normal coverage and CE mode A. A intraFreqHO-CE-ModeA-r13 parameter may define whether the UE when operating in CE mode A supports intra handover to target cell in normal coverage and CE mode A.

A new 32 bits signature in a MIB provided by a cell may be used to indicate if CE SIB1 is scheduled and its transport block size and number of repetitions. Such a signature may indicate that the cell supports CE features defined by 3GPP R13; a signature value of 0 may mean that the CE feature is not supported.

If CE features are supported by the cell, a CE SIB1 for Coverage Enhancement may be provided by the cell. A larger SI window length and repetition pattern may be used for CE SIBs. A narrow band (e.g., contiguous 6PRBs) and transport block size may also be used for CE SIBs. Additionally, a frequency hopping configuration may be used for CE SIBs. A CE SIB2 for Coverage Enhancement may also be provided. The CE SIBs may indicate CE PRACH configurations and CE mPDCCH/PDSCH/PUSCH/PCH common configurations.

Each CE level supported by a serving cell may be associated with a set of PRACH resources for transmission of Random Access Preambles. The CE level for a UE may be selected based on serving cell RSRP measurement and CE SIB2 rsrp-ThresholdsPrachInfoList. The maximum number of preamble transmission attempts (3/4/5/6/7/8/10) per each CE level may be provided by the CE SIB2. The number of repetitions (1/2/4/8/16/32/64/128) required for preamble transmission per attempt for each CE level may also be provided by the CE SIB2. Additionally, the narrow bands to monitor for the mPDCCH for a RAR in each CE level, the number of repetitions for mPDCCH common search space for RAR, msg3 and msg4, and the RA response window size and contention resolution Timer per CE level may all be provided by the CE SIB2.

If a UE is in enhanced coverage, it shall select a PRACH preamble for random access based on its corresponding CE level. The UE may transmit a preamble with corresponding number of repetitions, RA_RNTI, preamble ind and target power.

If the UE fails on max number of random access attempts on one CE level, it shall try to random access on next CE level.

The msg3 PUSCH repetition number may be indicated in the RAR received from the network.

A parameter PUCCH-NumRepetitionCE may provide a number of PUCCH repetitions for PUCCH format 1/1a/2/2a/2b for CE mode A.

A parameter PUCCH-numRepetitionCE-msg4-level0/1/2/3 may provide a number of repetitions for PUCCH carrying HARQ response to PDSH containing msg4 for PRACH CE level 0/1/2/3.

One paging occasion (PO) in a CE mode may include a subframe in which a P-RNTI is transmitted on the mPDCCH. The subframe may be determined by the UE based on its IMSI, DRX cycle, and number of paging narrow bands (Nn) provided in CE SIB2.

The mPDCCH carrying a PO can be repeated multiple times, e.g., as defined by the parameter mPDCCH-NumRepetition-Paging-R13 in CE SIB2.

Information on the coverage enhancement (CE) level, if available for the UE, may be provided transparently by the serving eNB to the MME at transition to ECM_IDLE together with the respective cell identifier, and may be provided to the E-UTRAN during paging. Paging attempt information may always be provided to all paged eNBs for UEs for which the information on the coverage enhancement level has been received.

If paging attempt information is included in the paging message, each paged eNB may receive the same information during a paging attempt. The paging attempt count may be increased by one at each new paging attempt. The next paging area scope, when present, indicates whether the MME plans to modify the paging area currently selected at next paging attempt. If the UE has changed its mobility state to ECM CONNECTED the Paging Attempt Count is reset.

A PUSCH transmission in an enhanced coverage mode can be in a N-subframe TTI bundle indicated by mPDCCH. A parameter PUSCH-maxNumRepetitionCEmodeA-r13, having a value of 8/16/32, may indicate a maximum value to indicate the set of PUSCH repetition numbers for CE mode A, e.g., among the following possibilities: {1, 2, 4, 8}, {1, 4, 8, 16}, {1,4, 16, 32}. A parameter PUSCH-maxNumRepetionCEmodeB-r13, having a value of 192/256/../2048, may indicate a maximum value to indicate the set of PUSCH repetition numbers for CE mode B. The PUSCH bandwidth may be limited to 6PRB, according to some embodiments. Uplink HARQ operation may be asynchronous for UEs in enhanced coverage except for the receptions within a bundle.

A PDSCH transmission in an enhanced coverage mode can be in a N-subframe TTI bundle indicated by mPDCCH. A parameter PDSCH-maxNumRepetionCEmodeA-r13, having a value of 8/16/32, may indicate a maximum value to indicate the set of PDSCH repetition numbers for CE mode A, e.g., among the following possibilities: {1, 2, 4, 8}, {1, 4, 8, 16}, {1, 4, 16, 32}. A parameter PDSCH-maxNum-RepetionCEmodeB-r13, having a value of 192/256/../2048, may indicate a maximum value to indicate the set of PDSCH repetition number for CE mode B. The PDSCH bandwidth may be limited to 6PRB, according to some embodiments.

The mPDCCH provided in an enhanced coverage mode may utilize a repetition level among the following repetition levels: {1, 2, 4, 8, 16, 32, 64, 128, 256}. The mPDCCH aggregation level may be among the following aggregation levels: {1, 2, 4, 8, 16, 12, 24}. The mPDCCH bandwidth may be limited to 6PRB, according to some embodiments.

An existing NW configuration for VoLTE may include PUSCH 4TTIB, 4HARQ, HARQ RTT 16 ms, with one/two audio packet bundling, TBS 208bits/328bits, segment 144/176 bits, 4 HARQ transmissions. An increase in HARQ transmissions from 4 to 7 could result in a link budget gain (e.g., ~2 dB, as one possibility).

A possible mPDCCH/PUSCH configuration in CE mode A could include PUSCH 8TTIB, 3 HARQ, HARQ RTT 24 ms, mPDCCH with 4 repetitions. For one audio packet bundling, TBS 208bits, segment 144/176 bits, 5/6/7 HARQ transmissions could be used. For two audio packet bundling, TBS 328bits, segment 144/176 bits, 5/6/7 HARQ transmissions could be used. This may provide a potential UL link budget gain of ~4-5 dB, as one possibility.

Another possible mPDCCH/PUSCH in CE mode A could include PUSCH 8TTIB, 2 HARQ, HARQ RTT 16 ms, mPDCCH with 2 repetitions. For one audio packet bundling, TBS 208 bits, segment 144/176 bits, HARQ 8/9/10 transmissions could be used. For two audio packet bundling, TBS 328 bits, segment 144/176 bits, HARQ 8/9/10 transmissions could be used. This may provide a potential UL link budget gain of ~6 dB-7 dB, as one possibility.

Another possible mPDCCH/PUSCH in CE mode A could include PUSCH 4TTIB, 3 HARQ, HARQ RTT 12 ms, mPDCCH with 2 repetitions. For one audio packet bundling, TBS 208 bits, segment 144/176 bits, HARQ 10/11/12 transmissions could be used. For two audio packet bundling, TBS 328 bits, segment 144/176 bits, HARQ 10/11/12 transmissions could be used. This may provide a potential UL link budget gain of 4 dB-5 dB, as one possibility.

For a UE with category 1 and above, when in a coverage beyond normal coverage, in order to not go out-of-service (OOS), it may be possible for a wireless device to dynamically utilize a coverage enhancement feature if it is supported by eNodeB. As part of such techniques, when a cell is selected as serving cell to camp on, a UE may determine if the cell supports 3GPP R13 coverage enhancement feature by checking if the CE signature present in MIB. If CE is supported on the serving cell, the UE may store CE SIBs for CE level thresholds, CE PRACH and mPDCCH configurations.

When in idle mode, based on serving cell measurements, the UE may determine if it is in normal coverage or enhanced coverage and its corresponding CE level. If the UE is entering enhanced coverage from normal coverage, UE may utilize the configuration information from the CE SIBs to establish a mobility management connection (perform a TAU or send any other MM message) to update its MME to switch to CE mode idle paging. The UE may switch to listen to the mPDCCH for idle paging. When the MME eventually pages the UE, the MME may send the UE's CE level information and page attempt count information to a group of eNodeBs. Each eNodeB in the group may thus determine to page the UE on the mPDCCH if the UE is in enhanced coverage, and may otherwise page the UE on the PDCCH. Additionally, the UE's intra/inter cell re-selection may be based on cell selection criterion S for enhanced coverage (e.g., instead of cell selection criterion S for normal coverage).

If the UE is entering normal coverage from enhanced coverage, the UE may continue to listen to the mPDCCH for idle paging, or may establish a mobility management connection (e.g., perform a TAU) to update its MME to switch to normal mode idle paging, in which case the UE may switch to listen to the PDCCH for idle paging. Additionally, its intra/inter cell re-selection may be based on cell selection criterion S for normal coverage (e.g., instead of cell selection criterion S for enhanced coverage).

When establishing a RRC connection, if the UE is in normal coverage, it may select a PRACH preamble for normal coverage for performing a random access procedure. If the UE is in enhanced coverage, it may select a PRACH preamble from the corresponding enhanced coverage level for performing a random access procedure.

When exiting a RRC connection, if the UE is in normal coverage, it may enter idle mode in normal coverage, read normal SIBs, and listen to the PDCCH for idle paging. If the UE is in enhanced coverage, it may enter idle mode in enhanced coverage, read CE SIBs, and listen to the mPDCCH for idle paging. Alternatively, as described previously herein, if desired, a UE may listen to both the PDCCH and the mPDCCH for idle mode paging, and the network may attempt to page the UE on one of the PDCCH or mPDCCH (e.g., depending on the coverage mode of the UE) initially, and may switch to attempting to page the UE on the other control channel after one or more unsuccessful attempts on the initial control channel.

During an RRC connection, if the UE is entering enhanced coverage from normal coverage, the UE may use a PRACH preamble from its corresponding CE level to re-establish the RRC connection; or, alternatively, the NW may reconfigure the RRC connection to use the mPDCCH, e.g., based on a UE triggered measurement report. If the UE is entering normal coverage from enhanced coverage, the UE may use a PRACH preamble for normal coverage to re-establish the RRC connection; or, alternatively, the may NW reconfigure the RRC connection to use the PDCCH, e.g., based on a UE triggered measurement report. The network may also perform same-cell handover using a dedicated PRACH preamble for enhanced coverage to switch the UE to use of the mPDCCH during the RRC connection; or, conversely, the network may use a dedicated PRACH preamble for normal coverage to switch the UE to use of the PDCCH during the RRC connection. Further, the NW may perform NW triggered HO from a cell in enhanced coverage to a cell in normal coverage, or a cell in normal coverage to a cell in enhanced coverage. The UE may trigger RRC re-establishment to a cell in normal coverage from a cell in enhanced coverage, or from a cell in normal coverage to a cell in enhanced coverage. Additionally, the network may use the RRC connection release message to indicate to a UE whether to operate in normal coverage mode or enhanced coverage mode after the RRC connection is released.

In the following further exemplary embodiments are provided.

One set of embodiments may include a method, comprising: by a wireless device: establishing a radio resource control (RRC) connection with a cellular base station; releasing the RRC connection with the cellular base station, wherein the wireless device is in one of a normal coverage mode or an enhanced coverage mode when releasing the RRC connection; monitoring a control channel associated with the normal coverage mode during a paging occasion; and monitoring a control channel associated with the enhanced coverage mode during the paging occasion if a paging indication is not successfully decoded on the control channel associated with the normal coverage mode.

According to some embodiments, the method further comprises, if a paging indication is not successfully decoded on the control channel associated with the enhanced coverage mode during a first subframe of the paging occasion: determining a signal strength of the control channel associated with the enhanced coverage mode during the first subframe of the paging occasion; determining that there is no paging indication from the cellular base station for the paging occasion if the signal strength of the control channel associated with the enhanced coverage mode during the first subframe of the paging occasion is above a signal strength threshold; and attempting to decode the control channel associated with the enhanced coverage mode during a second subframe of the paging occasion if the signal strength of the control channel associated with the enhanced coverage mode during the first subframe of the paging occasion is below the signal strength threshold.

According to some embodiments, attempting to decode the control channel associated with the enhanced coverage mode during the second subframe of the paging occasion comprises performing soft combining of the control channel associated with the enhanced coverage mode received in the first subframe of the paging occasion with the control channel associated with the enhanced coverage mode received in the second subframe of the paging occasion.

According to some embodiments, the method further comprises: determining that there is no paging indication from the cellular base station for the paging occasion if the signal strength of the control channel associated with the enhanced coverage mode is above the signal strength threshold after soft combining of the control channel associated with the enhanced coverage mode received in the first subframe of the paging occasion with the control channel associated with the enhanced coverage mode received in the second subframe of the paging occasion; and attempting to decode the control channel associated with the enhanced coverage mode during a third subframe of the paging occasion if the signal strength of the control channel associated with the enhanced coverage mode is below the signal strength threshold after soft combining of the control channel associated with the enhanced coverage mode received in the first subframe of the paging occasion with the control channel associated with the enhanced coverage mode received in the second subframe of the paging occasion.

According to some embodiments, the method further comprises, if a paging indication is successfully decoded based on monitoring the control channel associated with the enhanced coverage mode: determining an amount of time to sleep until attempting to decode a paging message indicated by the paging indication based at least in part on a number of repetitions of the control channel associated with the enhanced coverage mode occurred to successfully decode the paging indication and estimated channel conditions for the wireless device; entering a sleep mode for the determined amount of time; and attempting to decode the paging message indicated by the paging indication after the determined amount of time.

According to some embodiments, the wireless device remains in the sleep mode through at least one repetition of the paging message.

According to some embodiments, the wireless device comprises a dual subscriber identity module dual standby (DSDS) device configured to concurrently operate according to a first RAT and a second RAT in idle mode, wherein said monitoring the control channel associated with the enhanced coverage mode during the paging occasion is associated with the first RAT, wherein the method further comprises, determining that a paging occasion conflict exists between the first RAT and the second RAT; and determining to skip monitoring one or more repetitions of the control channel associated with the enhanced coverage mode for the paging occasion to monitor a control channel associated with the second RAT based at least in part on determining that the paging occasion conflict exists between the first RAT and the second RAT.

According to some embodiments, the method further comprises: providing an indication to the base station to serve the wireless device in the enhanced coverage mode based at least in part on the wireless device comprising a DSDS device.

According to some embodiments, the method further comprises: receiving a broadcast indication of a paging arrangement used by the cellular base station, wherein monitoring the control channel associated with the normal coverage mode during the paging occasion and monitoring the control channel associated with the enhanced coverage mode during the paging occasion if a paging indication is not successfully decoded on the control channel associated with the normal coverage mode are performed based at least in part on the broadcast indication of the paging arrangement used by the cellular base station.

Another set of embodiments may include a method, comprising: by a cellular base station: receiving an indication to page a wireless device, attempting to page the wireless device using a first control channel; and attempting to page the wireless device using a second control channel if attempting to page the wireless device using the first control channel is unsuccessful.

According to some embodiments, the indication to page the wireless device further indicates whether the wireless device is in a normal coverage mode or an enhanced coverage mode, wherein the first control channel comprises a control channel associated with the normal coverage mode and the second control channel comprises a control channel associated with the enhanced coverage mode when the wireless device is in the normal coverage mode, wherein the first control channel comprises a control channel associated with the enhanced coverage mode and the second control channel comprises a control channel associated with the normal coverage mode when the wireless device is in the enhanced coverage mode.

Yet another set of embodiments may include a method, comprising: by a cellular base station: receiving an indication to page a wireless device, wherein the indication to page the wireless device further indicates whether the wireless device is in a normal coverage mode or an enhanced coverage mode and a number of previous attempts to page the wireless device that have occurred; determining whether to attempt to page the wireless device using a control channel associated with the normal coverage mode or using a control channel associated with the enhanced coverage mode based at least in part on whether the wireless device is in the normal coverage mode or the enhanced coverage mode and the number of previous attempts to page the wireless device that have occurred; and attempting to page the wireless device using the determined control channel.

A further set of embodiments may include a method, comprising: by a cellular base station: determining whether to page according to a first paging arrangement or a second paging arrangement; providing a broadcast indication of the determined paging arrangement; receiving an indication to page a wireless device, and attempting to page the wireless device using the determined paging arrangement.

According to some embodiments, the first paging arrangement comprises always paging using a control channel associated with an enhanced coverage mode, wherein the second paging arrangement comprises initially attempting to perform paging using a control channel associated with a normal coverage mode and attempting to perform paging using the control channel associated with the enhanced coverage mode if attempting to perform paging using the control channel associated with the normal coverage mode is unsuccessful.

According to some embodiments, determining whether to page according to the first paging arrangement or the second paging arrangement is based at least in part on current loading conditions for the cellular base station.

According to some embodiments, the control channel associated with the normal coverage mode comprises a third generation partnership project (3GPP) compliant physical downlink control channel (PDCCH); wherein the control channel associated with the enhanced coverage mode comprises a 3GPP compliant machine type communication (MTC) PDCCH (mPDCCH).

A still further exemplary set of embodiments may include an apparatus, comprising a processing element configured to cause a device to implement any or all parts of the preceding examples.

Another exemplary set of embodiments may include a device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element coupled to a memory storing program instructions, wherein the program instructions are executable by the processing element to cause a wireless device to:
establish a radio resource control (RRC) connection with a cellular base station;
release the RRC connection with the cellular base station, wherein the wireless device is in an enhanced coverage mode when releasing the RRC connection;
monitor a control channel associated with the enhanced coverage mode during a paging occasion for a paging indication, wherein the paging occasion includes one of more subframes; and
if the paging indication is successfully decoded based on monitoring the control channel associated with the enhanced coverage mode during the paging occasion:
determine an amount of time to sleep until attempting to decode a paging message indicated by the paging indication based at least in part on a number of repetitions of the control channel associated with the enhanced coverage mode used to successfully decode the paging indication;
enter a sleep mode for the determined amount of time, wherein the wireless device is in the sleep mode through at least one repetition of the control channel associated with the enhanced coverage mode used to successfully decode the paging indication; and
attempt to decode the paging message indicated by the paging indication after the determined amount of time.

2. The apparatus of claim 1, wherein the processing element is further configured to cause the wireless device to:
monitor a control channel associated with the normal coverage mode during a paging occasion; and
monitor the control channel associated with the enhanced coverage mode during the paging occasion if a paging indication is not successfully decoded on the control channel associated with the normal coverage mode.

3. The apparatus of claim 1,
wherein to attempt to decode the control channel associated with the enhanced coverage mode during the second subframe of the paging occasion, the processing element is further configured to cause the wireless device to:
perform soft combining of the control channel associated with the enhanced coverage mode received in the first subframe of the paging occasion with the control channel associated with the enhanced coverage mode received in the second subframe of the paging occasion.

4. The apparatus of claim 3, wherein the processing element is further configured to cause the wireless device to:
determine that there is no paging indication from the cellular base station for the paging occasion if the signal strength of the control channel associated with the enhanced coverage mode is above the signal strength threshold after soft combining of the control channel associated with the enhanced coverage mode received in the first subframe of the paging occasion with the control channel associated with the enhanced coverage mode received in the second subframe of the paging occasion; and
attempt to decode the control channel associated with the enhanced coverage mode during a third subframe of the paging occasion if the signal strength of the control channel associated with the enhanced coverage mode is below the signal strength threshold after soft combining of the control channel associated with the enhanced coverage mode received in the first subframe of the paging occasion with the control channel associated with the enhanced coverage mode received in the second subframe of the paging occasion.

5. The apparatus of claim 1,
wherein the wireless device remains in the sleep mode through at least one repetition of the paging message.

6. The apparatus of claim 1, wherein the wireless device comprises a dual subscriber identity module dual standby (DSDS) device configured to concurrently operate according to a first RAT and a second RAT in idle mode, wherein said monitoring the control channel associated with the enhanced coverage mode during the paging occasion is associated with the first RAT, wherein the processing element is further configured to cause the wireless device to:
determine that a paging occasion conflict exists between the first RAT and the second RAT; and
determine to skip monitoring one or more repetitions of the control channel associated with the enhanced coverage mode for the paging occasion to monitor a control channel associated with the second RAT based at least in part on determining that the paging occasion conflict exists between the first RAT and the second RAT.

7. The apparatus of claim 2, wherein the processing element is further configured to cause the wireless device to:
receive a broadcast indication of a paging arrangement used by the cellular base station,
wherein the processing element is configured to cause the wireless device to monitor the control channel associated with the normal coverage mode during the paging occasion and monitor the control channel associated with the enhanced coverage mode during the paging occasion if a paging indication is not successfully decoded on the control channel associated with the normal coverage mode based at least in part on the broadcast indication of the paging arrangement used by the cellular base station.

8. A user equipment device (UE), comprising:
one or more radios;
a non-transitory memory medium;
a processing element coupled to the one or more radios and the non-transitory memory medium, wherein the UE is configured to:
establish a radio resource control (RRC) connection with a cellular base station;
release the RRC connection with the cellular base station, wherein the UE is in an enhanced coverage mode when releasing the RRC connection;
monitor a control channel associated with the enhanced coverage mode during a paging occasion for a paging indication, wherein the paging occasion includes one of more subframes; and
if the paging indication is successfully decoded based on monitoring the control channel associated with the enhanced coverage mode during the paging occasion:
determine an amount of time to sleep until attempting to decode a paging message indicated by the paging indication based at least in part on estimated channel conditions for the UE;
enter a sleep mode for the determined amount of time, wherein the UE remains in the sleep mode through at least one repetition of the paging message indicated by the paging indication; and
attempt to decode the paging message indicated by the paging indication after the determined amount of time.

9. The UE of claim 8,
wherein determining an amount of time to sleep until attempting to decode a paging message indicated by the paging indication is further based on based at least in part on a number of repetitions of the control channel associated with the enhanced coverage mode used to successfully decode the paging indication.

10. The UE of claim 9,
wherein the UE is in the sleep mode through at least one repetition of the control channel associated with the enhanced coverage mode used to successfully decode the paging indication.

11. The UE of claim 8, wherein the UE is further configured to:
monitor a control channel associated with the normal coverage mode during a paging occasion; and
monitor the control channel associated with the enhanced coverage mode during the paging occasion if a paging indication is not successfully decoded on the control channel associated with the normal coverage mode.

12. The UE of claim 8,
wherein to attempt to decode the control channel associated with the enhanced coverage mode during the second subframe of the paging occasion, the UE is further configured to:
perform soft combining of the control channel associated with the enhanced coverage mode received in the first subframe of the paging occasion with the control channel associated with the enhanced coverage mode received in the second subframe of the paging occasion.

13. The UE of claim 12, wherein the UE is further configured to:
determine that there is no paging indication from the cellular base station for the paging occasion if the signal strength of the control channel associated with the enhanced coverage mode is above the signal strength threshold after soft combining of the control channel associated with the enhanced coverage mode received in the first subframe of the paging occasion with the control channel associated with the enhanced coverage mode received in the second subframe of the paging occasion; and
attempt to decode the control channel associated with the enhanced coverage mode during a third subframe of the paging occasion if the signal strength of the control channel associated with the enhanced coverage mode is below the signal strength threshold after soft combining of the control channel associated with the enhanced coverage mode received in the first subframe of the paging occasion with the control channel associated with the enhanced coverage mode received in the second subframe of the paging occasion.

14. The UE of claim 8, wherein the UE further comprises a dual subscriber identity module dual standby (DSDS) device configured to concurrently operate according to a first RAT and a second RAT in idle mode, wherein said monitoring the control channel associated with the enhanced coverage mode during the paging occasion is associated with the first RAT, wherein the UE is further configured to:
 determine that a paging occasion conflict exists between the first RAT and the second RAT; and
 determine to skip monitoring one or more repetitions of the control channel associated with the enhanced coverage mode for the paging occasion to monitor a control channel associated with the second RAT based at least in part on determining that the paging occasion conflict exists between the first RAT and the second RAT.

15. The UE of claim 8, wherein the UE is further configured to:
 receive a broadcast indication of a paging arrangement used by the cellular base station,
 monitor the control channel associated with the normal coverage mode during the paging occasion and monitor the control channel associated with the enhanced coverage mode during the paging occasion if a paging indication is not successfully decoded on the control channel associated with the normal coverage mode based at least in part on the broadcast indication of the paging arrangement used by the cellular base station.

16. A method, comprising:
 by a user equipment device (UE):
  establishing a radio resource control (RRC) connection with a cellular base station;
  releasing the RRC connection with the cellular base station, wherein the UE is in an enhanced coverage mode when releasing the RRC connection;
  monitoring a control channel associated with the enhanced coverage mode during a paging occasion for a paging indication, wherein the paging occasion includes one of more subframes; and
  if the paging indication is successfully decoded based on monitoring the control channel associated with the enhanced coverage mode during the paging occasion:
   determining an amount of time to sleep until attempting to decode a paging message indicated by the paging indication based at least in part on estimated channel conditions for the UE;
   entering a sleep mode for the determined amount of time, wherein the UE remains in the sleep mode through at least one repetition of the paging message indicated by the paging indication; and
   attempting to decode the paging message indicated by the paging indication after the determined amount of time.

17. The method of claim 16,
wherein determining an amount of time to sleep until attempting to decode a paging message indicated by the paging indication is further based on based at least in part on a number of repetitions of the control channel associated with the enhanced coverage mode used to successfully decode the paging indication.

18. The method of claim 17,
wherein the UE is in the sleep mode through at least one repetition of the control channel associated with the enhanced coverage mode used to successfully decode the paging indication.

19. The method of claim 16, the method further comprising:
 monitoring a control channel associated with the normal coverage mode during a paging occasion; and
 monitoring the control channel associated with the enhanced coverage mode during the paging occasion if a paging indication is not successfully decoded on the control channel associated with the normal coverage mode.

20. The method of claim 16, wherein the UE comprises a dual subscriber identity module dual standby (DSDS) device configured to concurrently operate according to a first RAT and a second RAT in idle mode, wherein said monitoring the control channel associated with the enhanced coverage mode during the paging occasion is associated with the first RAT, wherein the method further comprises:
 determining that a paging occasion conflict exists between the first RAT and the second RAT; and
 determining to skip monitoring one or more repetitions of the control channel associated with the enhanced coverage mode for the paging occasion to monitor a control channel associated with the second RAT based at least in part on determining that the paging occasion conflict exists between the first RAT and the second RAT.

* * * * *

UNITED STATES PATENT AND TRADEMARK OFFICE
CERTIFICATE OF CORRECTION

PATENT NO. : 10,542,520 B2
APPLICATION NO. : 16/511242
DATED : January 21, 2020
INVENTOR(S) : Li Su, Sami M. Almafouh and Jianxiong Shi It is certified that error appears in the above-identified patent and that said Letters Patent is hereby corrected as shown below:

In the Claims

Claim 1, Column 28, Line 32, please delete "of" and insert --or--.

Claim 2, Column 28, Line 54, please delete "a paging occasion" and insert --the paging occasion--.

Claim 2, Column 28, Line 56, please delete "a paging indication" and insert --the paging indication--.

Claim 2, Column 28, Line 58, please delete "the normal coverage mode" and insert --a normal coverage mode--.

Claim 3, Column 28, Lines 61-62, please delete "the second subframe" and insert --a second subframe--.

Claim 3, Column 28, Lines 66-67, please delete "the first subframe" and insert --a first subframe--.

Claim 4, Column 29, Lines 7-8, please delete "the signal strength" and insert --signal strength--.

Claim 7, Column 29, Line 46, delete "apparatus of claim 2" and insert --apparatus of claim 1--.

Claim 7, Column 29, Line 51, please delete "the control channel" and insert --a control channel--.

Claim 7, Column 29, Line 52, please delete "the normal coverage mode" and insert --a normal coverage mode--.

Claim 7, Column 29, Line 55, please delete "a paging indication" and insert --the paging indication--.

Claim 11, Column 30, Line 37, please delete "the normal coverage mode" and insert --a normal coverage mode--.

Signed and Sealed this
Nineteenth Day of May, 2020

Andrei Iancu
*Director of the United States Patent and Trademark Office*

Claim 12, Column 30, Lines 45-46, please delete "the second subframe" and insert --a second subframe--.

Claim 12, Column 30, Lines 49-50, please delete "the first subframe" and insert --a first subframe--.

Claim 15, Column 31, Line 29, please delete "the normal coverage mode" and insert --a normal coverage mode--.

Claim 19, Column 32, Line 26, please delete "the normal coverage mode" and insert --a normal coverage mode--.

Claim 19, Column 32, Line 27, please delete "a paging occasion" and insert --the paging occasion--.

Claim 19, Column 32, Line 30, please delete "a paging indication" and insert --the paging indication--.